(12) United States Patent
Takeuchi et al.

(10) Patent No.: US 8,290,883 B2
(45) Date of Patent: Oct. 16, 2012

(54) LEARNING SYSTEM AND LEARNING METHOD COMPRISING AN EVENT LIST DATABASE

(75) Inventors: Johane Takeuchi, Wako (JP); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 566 days.

(21) Appl. No.: 12/556,872

(22) Filed: Sep. 10, 2009

(65) Prior Publication Data

US 2010/0070439 A1 Mar. 18, 2010

Related U.S. Application Data

(60) Provisional application No. 61/136,610, filed on Sep. 18, 2008.

(30) Foreign Application Priority Data

Aug. 12, 2009 (JP) ................................ 2009-187526

(51) Int. Cl.
G06F 15/18 (2006.01)
(52) U.S. Cl. ........................................................ 706/12
(58) Field of Classification Search ................ 706/12, 706/45, 62
See application file for complete search history.

(56) References Cited

U.S. PATENT DOCUMENTS

| | | | |
|---|---|---|---|
| 2004/0015386 A1* | 1/2004 | Abe et al. ......................... | 705/10 |
| 2004/0073764 A1* | 4/2004 | Andreasson .................. | 711/170 |
| 2007/0260346 A1* | 11/2007 | Ganesan et al. .............. | 700/108 |
| 2010/0137734 A1* | 6/2010 | Digiovanna et al. .......... | 600/545 |

OTHER PUBLICATIONS

Asada et al., Behavior Coordination for a Mobile Robot Using Modular Reinforcement Learning, 1996, IEEE, pp. 1329-1336.*
Asada et al., Action-Based Sensor Space Categorization for Robot Learning, 1996, IEEE, pp. 1502-1509.*
Smart et al., Effective Reinforcement Learning for Mobile Robots, 2002, ICRA'02, pp. 1-7.*
Bhanu et al., Real-Time Robot Learning, 2001, IEEE, pp. 491-498.*
Takeuchi et al., Modular Neural Networks for Reinforcement Learning with Temporal Intrinsic Rewards, 2007, IEEE, pp. 1-6.*
Nathniel Daw et al., "Uncertainty-based competition between prefrontal and dorsolateral striatal systems for behavioral control" vol. 8, No. 12, Dec. 2005, Nature Neuroscience, pp. 1704-1711.
Richard Sutton et al., "Reinforcement Learning: An Introduction", MIT Press, 1998, Table of Contents, a total of 4 pages, "http://www.cs.ualberta.ca/sutton/book/the-book.html".

* cited by examiner

*Primary Examiner* — David Vincent
(74) *Attorney, Agent, or Firm* — Squire Sanders (US) LLP (57) ABSTRACT

A learning system according to the present invention includes an event list database for storing a plurality of event lists, each of the event lists being a set including a series of state-action pairs which reaches a state-action pair immediately before earning a reward, an event list managing section for classifying state-action pairs into the plurality of event lists for storing, and a learning control section for updating expectation of reward of a state-action pair which is an element of each of the event lists.

6 Claims, 8 Drawing Sheets

LEARNING SYSTEM AND LEARNING METHOD COMPRISING AN EVENT LIST DATABASE

BACKGROUND OF THE INVENTION

1. Field of the Invention

The present invention relates to a learning system and a learning method based on reinforcement learning.

2. Background Art

Reinforcement learning is known as a method of learning by which a machine such as a robot improves its control rule to adapt to its target. For example, non-patent document "Sutton, R. S. & Barto, A. G. Reinforcement Learning: An Introduction MIT Press, 1998" can be referred to. Further, some biological studies show a possibility that the brain performs reinforcement learning with an explicit environmental model. For example, non-patent document "N. D. Daw, Y Niv & P. Dayan, "Uncertainty-based competition between prefrontal and dorsolateral striatal systems for behavioral control", Nature Neuroscience, 2005, 8, pp 1704-1711" can be referred to. Reinforcement learning with an explicit environmental model can advantageously adapt to a change in environment to which a conventional type of reinforcement learning without an environmental model can hardly adapt and it can advantageously manage an acquired sequence of actions as a group.

On the other hand, reinforcement learning with an explicit environmental model requires very high computational costs because operation such as searching a tree structure representing the environmental model has to be performed.

Thus, a reinforcement learning system and a reinforcement learning method with an explicit environmental model and with low computational costs have not been developed.

Accordingly, there is a need for a reinforcement learning system and a reinforcement learning method with an explicit environmental model and with low computational costs, which can adapt to a change in environment and can manage an acquired sequence of actions as a group.

SUMMARY OF THE INVENTION

A learning system according to the present invention includes an event list database for storing a plurality of event lists, each of the event lists being a set including a series of state-action pairs which reaches a state-action pair immediately before earning a reward, an event list managing section for classifying state-action pairs into the plurality of event lists for storing, and a learning control section for updating expectation of reward of a state-action pair which is an element of each of the plurality of event lists.

A learning method according to the present invention is performed by a learning system having an event list database for storing a plurality of event lists, each of the event lists being a set including a series of state-action pairs which reaches a state-action pair immediately before earning a reward, an event list managing section and a learning control section. The method includes the steps of classifying, by the event list managing section, state-action pairs into the plurality of event lists for storing and updating, by the learning control section, expectation of reward of a state-action pair which is an element of each of the plurality of event lists.

In the learning system and the learning method according to the present invention an event list is defined as a set including a series of state-action pairs which reaches a state-action pair immediately before earning a reward and state-action pairs are classified into a plurality of event lists for storing. As a result an environmental model is created for each state-action pair immediately before earning a reward. Accordingly, the learning system and the learning method according to the present invention can adapt to a change in environment and can manage an acquired sequence of actions as a group, that is, an event list.

According to an embodiment of the present invention, every time an action is selected the event list managing section has the state-action pair temporarily stored and every time a reward is earned the event list managing section has a state-action pair in a set of state-action pairs temporarily stored, which has not been stored in the event list database, stored as an element of the event list of the state-action pair immediately before earning the reward in the event list database.

According to the embodiment, state-action pairs can be classified into a plurality of event lists for storing with a high efficiency.

According to another embodiment of the present invention, every time a reward is earned the learning control section updates, using a value of the reward, expectation of reward of a state-action pair which is an element of the event list of the state-action pair immediately before earning the reward and updates, using 0 as a value of reward, expectation of reward of a state-action pair which is an element of the event lists except the event list of the state-action pair immediately before earning the reward.

According to the embodiment, in each event list expectations of state-action pairs each of which is an element of the event list can be updated with a high efficiency.

DETAILED DESCRIPTION OF THE INVENTION

Figure 1:
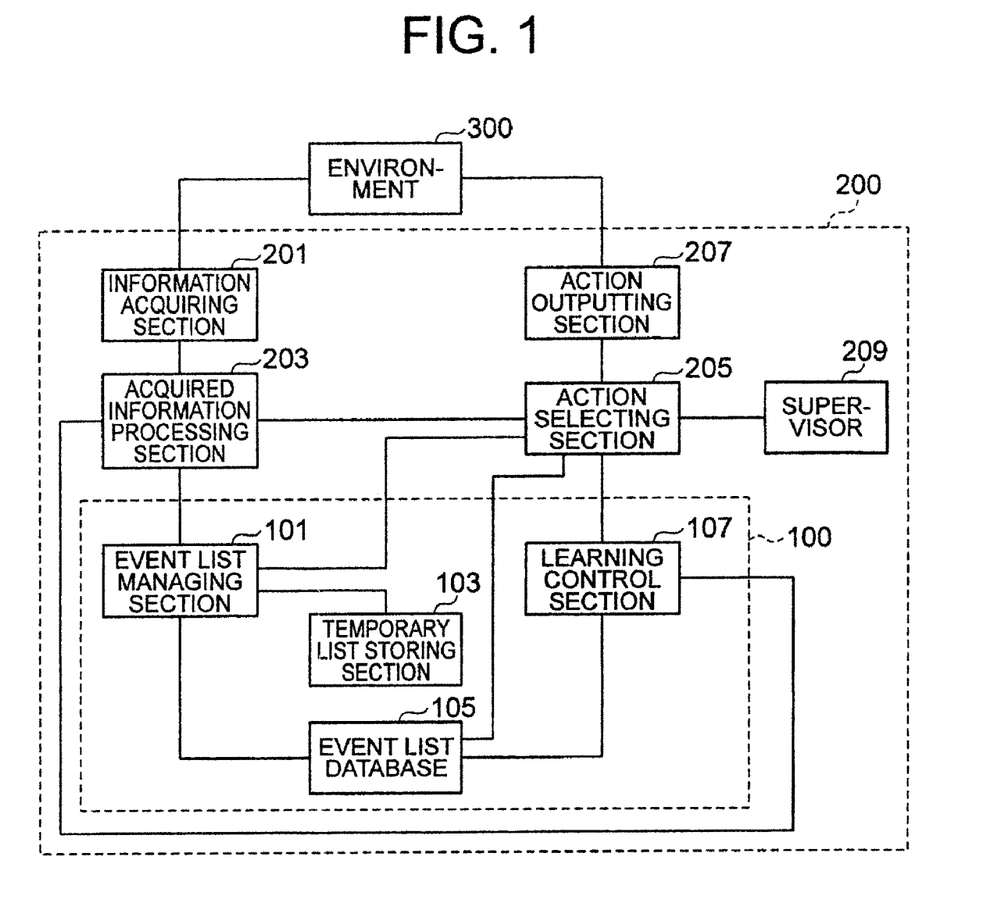
FIG. 1 illustrates a configuration of an apparatus including a learning system according to an embodiment of the present invention.

FIG. 1 illustrates a configuration of an apparatus 200 including a learning system 100 according to an embodiment of the present invention. The apparatus 200 may be a robot, for example. The apparatus 200 includes an information acquiring section 201, an acquired information processing section 203, an action selecting section 205, an action outputting section 207, a supervisor 209 and a learning system 100.

The information acquiring section 201 acquires information from the environment 300 and acquires information on the state of the apparatus 200, itself. When the apparatus 200 is a robot, the information acquiring section 201 may include a camera and may acquire information of the environment 300 using pictures taken with the camera. Further, the information acquiring section 201 may acquire the state of the apparatus 200 including a position and an orientation of the robot. The information acquiring section 201 sends the information thus acquired to the acquired information processing section 203.

The acquired information processing section 203 classifies the state of the apparatus 200 as one of the predetermined states according to the acquired information on the environment and the apparatus.

The learning system 100 stores an action selected by the apparatus 200 in a state of the apparatus 200 as a pair of the state and the action (a state-action pair) and learns an expectation of reward of the state-action pair according a reward earned as a result of the action. Rewards are determined by the acquired information processing section 203 based on information acquired by the information acquiring section 201. The learning system 100 includes an event list managing section 101, a temporary list storing section 103, an event list database 105 and a learning control section 107. The event list managing section 101 stores state-action pairs in the temporary list storing section 103 and the event list database 105. The learning control section 107 learns an expectation of reward for each state-action pair and stores the expectation in connection with the state-action pair in the event list database 105. The learning control section 107 will be described in detail later.

The action selecting section 205 receives the state of the apparatus 200 from the acquired information processing section 203 and selects by maximum probability the action with the maximum expectation of reward among the state-action pairs involving the state, stored in the event list database 105.

The action outputting section 207 outputs the action selected by the action selecting section 205. A change in the environment 300 generated as results of the action is acquired by the information acquiring section 201.

The supervisor 209 teaches the apparatus 200 the series of actions which will allow the apparatus 200 in a state to earn a reward within the shortest time. The supervisor 209 is used for the aid of the learning system 100 at initial stages of learning.

The learning system 100 according to an embodiment of the present invention is featured by classifying state-action pairs into sets of state-action pairs each set of which is grouped based on a state-action pair immediately before earning reward, by storing the state-action pairs grouped into the sets described above and by learning expectations of reward of the state-action pairs. Storing state-action pairs grouped into the sets each of which is grouped based on a state-action pair immediately before earning reward and learning expectations of reward of the state-action pairs mean creating an environmental model for each state-action pair immediately before earning reward. Accordingly, the learning system 100 according to the present embodiment can deal with a change in the environment and can manage an acquired series of actions as a group. The detailed description will follow.

Expectation of reward can be expressed as the following expression.

$$R(s_t, a_t) = E[\gamma^{k-1} r_{t+k} | s_t, a_t] (0 < \gamma \leq 1) \quad (1)$$

In Expression (1), E[|] represents conditional expectation.

"$s_t$" represents a state observed at time t. There exits a plurality of states to be observed, which are expressed as below, for example.

$$s_0, s_1, \ldots, s_i, \ldots, s_n$$

At time t one of the states is actually observed and the observed one is expressed as "$s_t$".

"$a_t$" represents an action selected at time t. There exits a plurality of actions to be selected, which are expressed as below, for example.

$$a_0, a_1, \ldots, a_i, \ldots, a_n$$

At time t one of the actions is actually selected and the selected one is expressed as "$a_t$".

"$r_{t+k}$" represents reward earned at t+k.

γ is a parameter called discount rate.

Expression (1) can be transformed as below.

$$R(s_t, a_t) = \sum_k \gamma^{k-1} p(k | s_t, a_t) \sum_{r_{t+k}} r_{t+k} \quad (2)$$

$$\sum_{(S,A)} p(r_{t+k} | S, A) p(S, A | s_t, a_t)$$

$$= \sum_{(S,A)} E_{(S,A)}[\gamma^{k-1} r_{t+k} | (s_t, a_t)]$$

p(k| . . . ) represents a probability that an episode reaches the end after k steps from the current moment. "Episode" refers to one of a series of states sequentially generated as a result of selection of actions in states. "End" refers to the final state of the series of states. A state becomes the final one when a reward is earned in the state or selection of action is interrupted in the state.

(S, A) represents ($s_{t+k-1}, a_{t+k-1}$), that is, a state immediately before earning reward $r_{t+k}$. When state $s_t$ is observed and action $a_t$ is selected at time t, the state-action pair is represented by ($s_t, a_t$).

E(S, A)[| . . . ] is a part of expectation of reward which is obtained by dividing expectation of reward according to states immediately before earning reward (S, A) and is called a partial expectation.

Expression (2) shows that expectation of reward can be expressed as a sum of partial expectations. Further, it shows that all state-action pairs ($s_i, a_j$) can be divided into a plurality of (S, A) groups. Thus, it proves to be possible to classify state-action pairs into sets of state-action pairs each set of which is grouped based on a state-action pair immediately before earning reward, to store the state-action pairs grouped into the sets described above and to learn expectations of reward of the state-action pairs.

Figure 2:
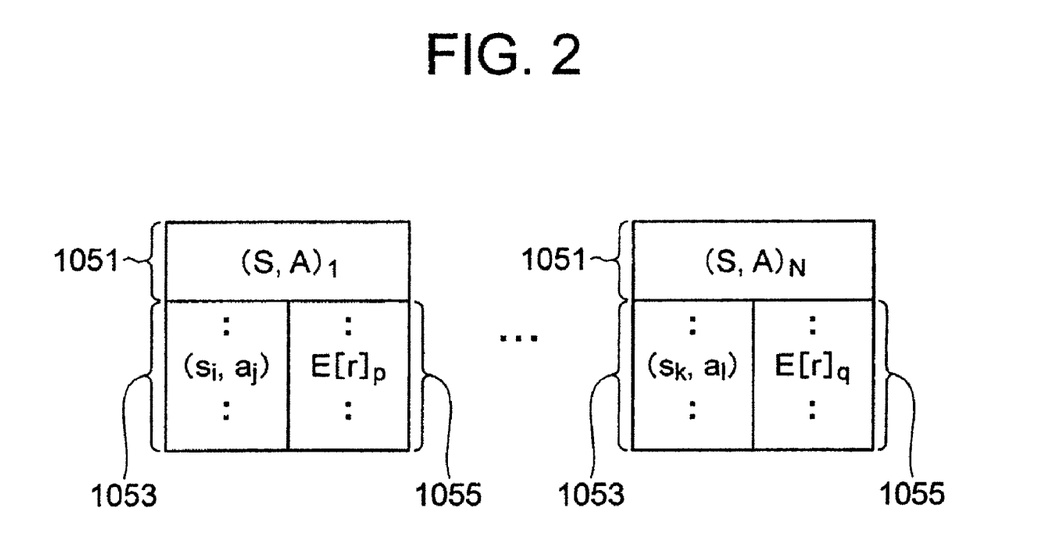
FIG. 2 illustrates the structure of the event list database.

FIG. 2 illustrates the structure of the event list database 105. In FIG. 2 (S, A) n represents a state-action pair immediately before earning reward. S represents a state existing immediately before earning reward while A represents an action taken immediately before earning reward. n represents the number of the state-action pair immediately before earning reward. (S, A) n forms a set of state-action pairs with a series of state-action pairs reaching (S, A) n. The set is called an event list. ($s_i, a_j$) represents a state-action pair included in the event list. s represents a state while a represents an action. i represents the number of the state s while j represents the number of the action a. Expectation of reward E[r]p of the state-action pair ($s_i, a_j$) is stored in connection with ($s_i, a_j$) in the event list. r represents reward while p represents an index of expectation of reward.

Thus, the state-action pairs stored in the event list database 105 are classified according to state-action pairs immediately before earning a reward 1051. The event list includes a state-action pair immediately before earning a reward 1051, a series of state-action pairs 1053 reaching the state-action pair 1051 and expectations of reward E[r]p each of which is connected to a state-action pair ($s_i, a_j$), that is, an element of the event list. Expectation of reward E[r]p corresponds to the partial expectation described above.

A state-action pair $(s_i, a_j)$ may be included in a plurality of event lists of a plurality of state-action pairs immediately before earning reward (S, A). In this case, the expectation of reward of the state-action pair $(s_i, a_j)$ is a sum of the expectations of reward included in the event lists of the plurality of (S, A).

Figure 3:
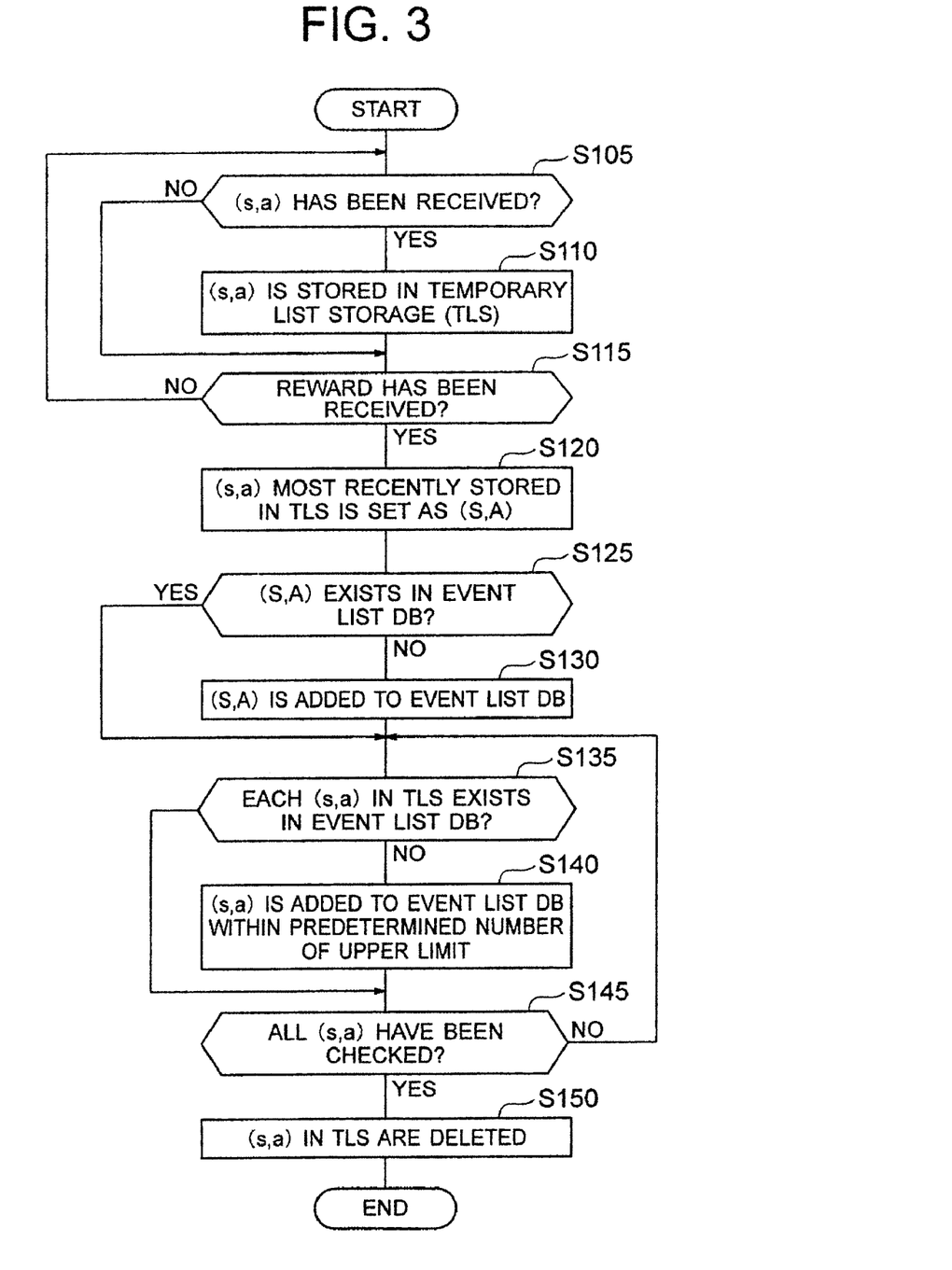
FIG. 3 is a flow chart for illustrating operation of the event list managing section.

FIG. 3 is a flow chart for illustrating operation of the event list managing section 101.

In step S105 of FIG. 3 the event list managing section 101 determines whether or not it has received a state-action pair $(s_i, a_j)$, from the action selecting section 205, which sends a state-action pair $(s_i, a_j)$ to the event list managing section 101 every time it selects an action. If a state-action pair $(s_i, a_j)$ is determined to have been received, the process goes to step S110. If a state-action pair $(s_i, a_j)$ is determined to have not been received, the process goes to step S115.

In step S110 of FIG. 3 the event list managing section 101 stores the state-action pair $(s_i, a_j)$ in the temporary list storing section 103.

In step S115 of FIG. 3 the event list managing section 101 determines whether or not it has received a reward from the acquired information processing section 203. The acquired information processing section 203 determines reward using information acquired by the information acquiring section 201 a predetermined period after the action outputting section outputs an action and sends the reward to the event list managing section 101. If a reward is determined to have been received, the process goes to step S120. If a reward is determined to have not been received, the process returns to step S105 after the expiration of a predetermined time interval.

In step S120 of FIG. 3 the event list managing section 101 sets the state-action pair $(s_i, a_j)$ stored most recently in the temporary list storing section 103 as a state-action pair immediately before earning reward (S, A).

In step S125 of FIG. 3 the event list managing section 101 determines whether or not the (S, A) exists in the event list database 105. If the (S, A) is determined to exist there, the process goes to step S135. If the (S, A) is determined to be absent there, the process goes to step S130.

In step S130 of FIG. 3, the event list managing section 101 stores the (S, A) in the event list database 105.

In step S135 of FIG. 3 the event list managing section 101 determines whether or not each of the state-action pairs $(s_i, a_j)$ stored in the temporary list storing section 103 is included in the event list of the (S, A) stored in the event list database 105. If all of the state-action pairs $(s_i, a_j)$ are included in the event list of the (S, A), the process goes to step S145. If any of the state-action pairs $(s_i, a_j)$ is not included in the event list of the (S, A), the process goes to step S140.

In step S140 of FIG. 3 the event list managing section 101 adds state-action pairs $(s_i, a_j)$ not included in the event list of the (S, A) to the event list of the (S, A). The upper limit of the number of state-action pairs to be added is predetermined.

In step S145 of FIG. 3 the event list managing section 101 determines whether or not step S135 has been performed for all of the state-action pairs $(s_i, a_j)$ stored in the temporary list storing section 103. If step S135 is determined to have been performed for all of the state-action pairs $(s_i, a_j)$, the process goes to step S150. If step S135 is determined to have not been performed for all of the state-action pairs $(s_i, a_j)$, the process returns to step S135.

In step S150 of FIG. 3 the event list managing section 101 deletes all of the state-action pairs $(s_i, a_j)$ stored in the temporary list storing section 103.

Figure 4:
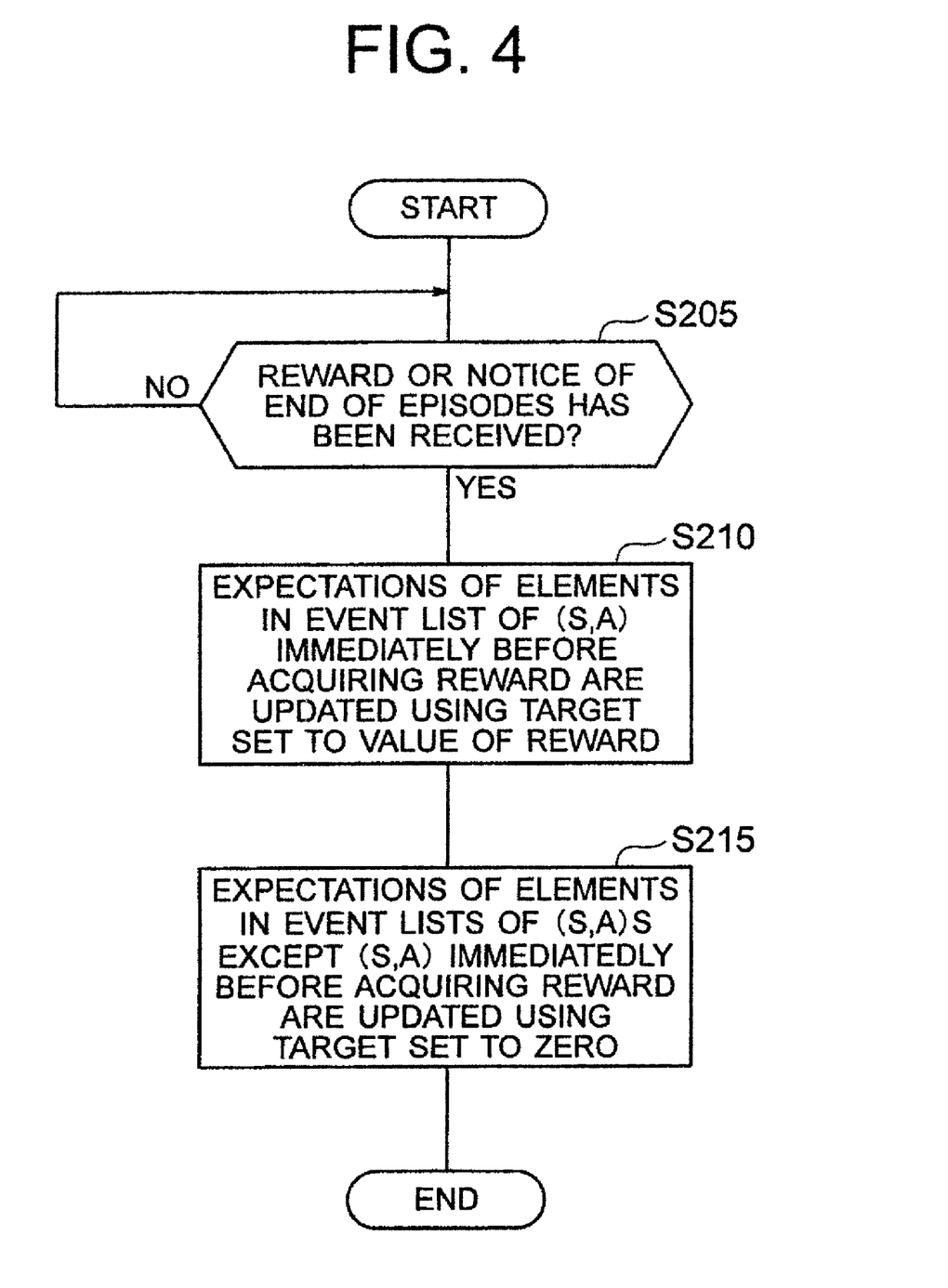
FIG. 4 is a flow chart for illustrating operation of the learning control section of the learning system.

FIG. 4 is a flow chart for illustrating operation of the learning control section 107 of the learning system 100.

In step S205 of FIG. 4, the learning control section 107 determines whether or not it has received a reward or a notice of end of episodes from the acquired information processing section 203. The acquired information processing section 203 determines a reward using information which is acquired by the information acquiring section 201 a predetermined period after the action outputting section has outputted an action, and sends the reward to the learning control section 107. Further, the acquired information processing section 203 sends a notice of end of episodes to the learning control section 107 when episodes reach the end for any reasons. If a reward or a notice of end of episodes is determined to have been received, the process goes to step S210. If a reward and a notice of end of episodes are determined to have not been received, the process returns to step S205 after the expiration of a predetermined time interval.

In step S210 of FIG. 4, the learning control section 107 updates expectations of reward of the state-action pairs $(s_i, a_j)$ in the event list of the state-action pair immediately before earning the reward (S, A) according to the following expression.

$$E_{(S,A)_L}[r|(s_i,a_j)] \leftarrow E_{(S,A)_L}[r|(s_i,a_j)] + \alpha\{Tv - E_{(S,A)_L}[r|(s_i,a_j)]\} \quad (3)$$

$\alpha$ is a parameter called a learning constant and a value between 0 and 1.

Target Tv is given by the following expression.

$$Tv = \gamma^{t-\tau} r_{t+1} \quad (4)$$

$\tau$ is a time at which an action $a_j$ is selected in a state $s_i$ to actually generate a state-action pair $(s_i, a_j)$.

In step S215 of FIG. 4, the learning control section 107 updates expectations of reward of the state-action pairs $(s_i, a_j)$ in the event lists except the event list of the state-action pair immediately before earning the reward (S, A) according to Expression (3). In this case Target Tv is set to 0. When a notice of end of episodes is received, expectations of reward of the state-action pairs $(s_1, a_j)$ in all event lists of (S, A) are updated according to Expression (3) with Target Tv set to 0.

Thus, expectations of reward of the state-action pairs are updated separately for each of the event lists grouped according to state-action pairs immediately before earning reward.

Figure 5:
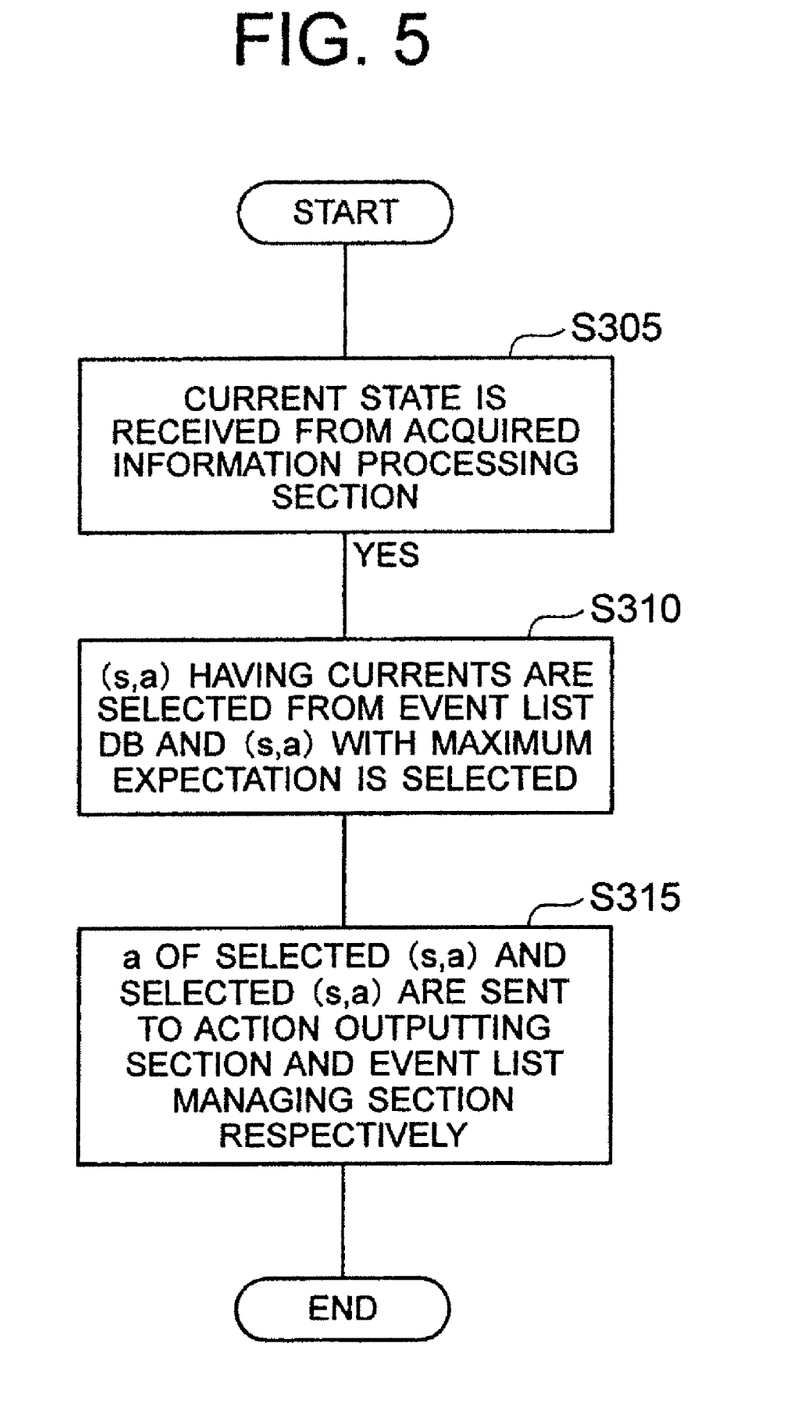
FIG. 5 is a flow chart for illustrating operation of the action selecting section.

FIG. 5 is a flow chart for illustrating operation of the action selecting section 205.

In step S305 of FIG. 5, the action selecting section 205 receives the current state from the acquired information processing section 203. The acquired information processing section 203 may send a reward to the learning control section 107 and may send the state to the action selecting section 205 after it is confirmed that the learning control section 107 has updated expectations of reward.

In step S310 of FIG. 5, the action selecting section 205 selects the state-action pairs having the current state from those in the event list database 105 and further selects the state-action pair with the maximum expectation of reward. As described above, if a state-action pair having the current state is included in a plurality of event lists, a sum of expectations of reward of the state-action pair having the current state and included in the plurality of event lists is regarded as expectation of reward of the state-action pair.

In step S315 of FIG. 5, the action selecting section 205 sends the action of the selected state-action pair to the action outputting section 207 and sends the selected state-action pair to the event list managing section 101.

Simulation experiment introduced to check functions of the learning system according to an embodiment of the present invention will be described below. First simulation environment and second simulation environment are prepared for the simulation experiment.

Figure 6:
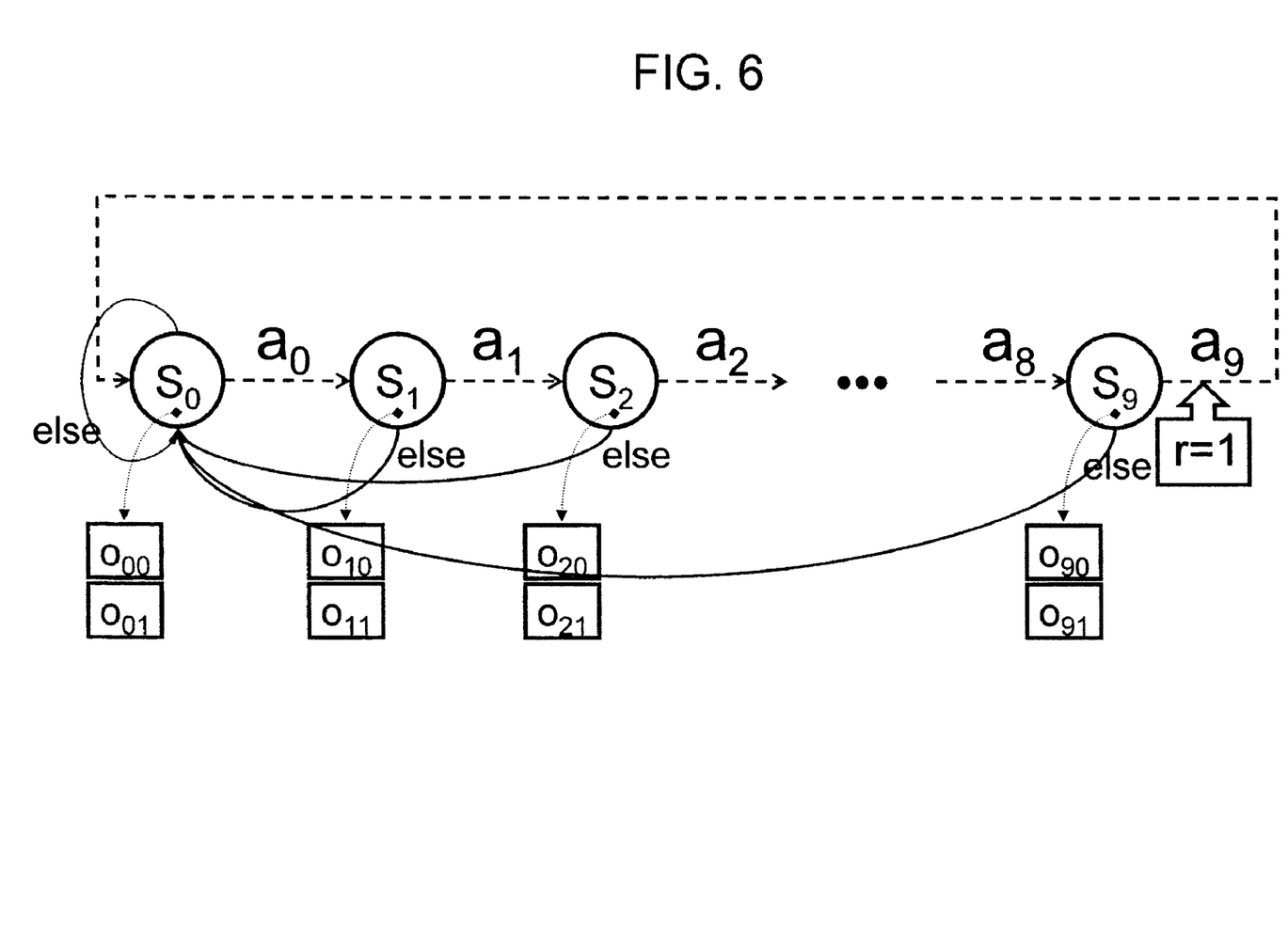
FIG. 6 illustrates a Markov Decision Process (MDP) of the first simulation environment.

FIG. 6 illustrates a Markov Decision Process (MDP) of the first simulation environment. Ten (10) actions $a_0, a_1, \ldots a_9$ can be selected. If actions $a_0$ to $a_9$ are selected in the increasing order of suffix after $s_0$ is observed, reward r=1 is earned. However, transitions are probabilistic. The probability of transition from $s_0$ to $s_1$ with action $a_0$ selected is 0.3. The probability of the other transitions in the correct sequence is 0.9. Further, two signals can be observed for each state. For example, signals $O_{00}$ and $O_{01}$ exist for $s_0$ and each of them is observed with a probability of 0.5. Accordingly, the number of combinations of signals to be observed until the reward is earned is $2^{10}=1024$.

Figure 7:
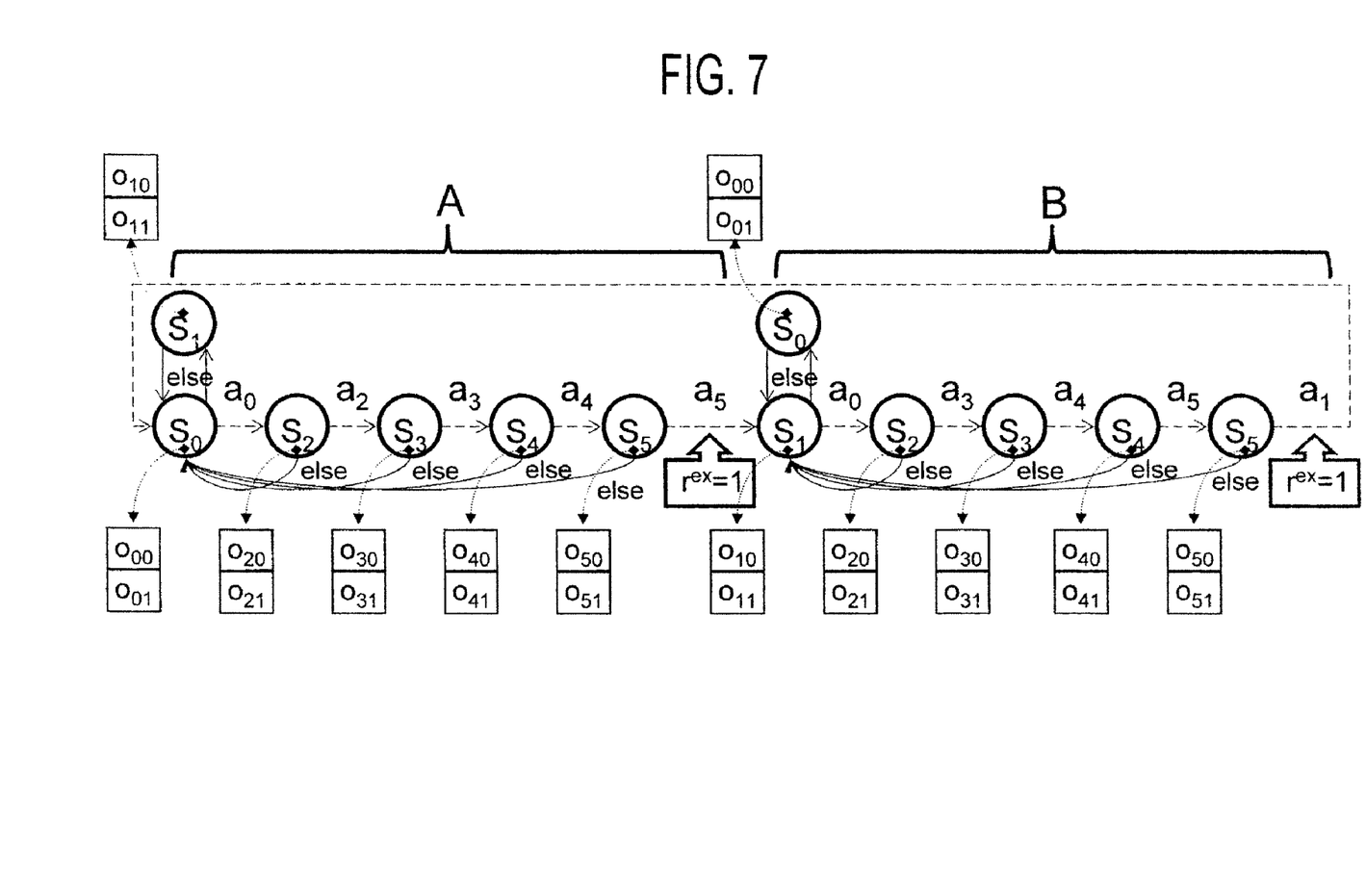
FIG. 7 illustrates a High Order Markov Decision Process (HOMDP) of the second simulation environment.

FIG. 7 illustrates a High Order Markov Decision Process (HOMDP) of the second simulation environment. Ten (10) actions $a_0, a_1, \ldots a_9$ can be selected, among which six (6) actions $a_0, a_1, \ldots a_5$ relate to earning reward. The process includes process A and process B. If a reward is earned in process A, process B has to be selected to earn another reward while if a reward is earned in process B, process A has to be selected to earn another reward. That is, different actions have to be selected in process A and in process B for the same observation signal. In the second simulation environment also, transitions are probabilistic. In process A the probability of transition from $s_0$ to $s_2$ with action $a_0$ selected is 0.3 while the probability of the other transitions in the correct sequence is 0.9. In process B the probability of transition from $s_1$ to $s_2$ with action $a_0$ selected is 0.3 while the probability of the other transitions in the correct sequence is 0.9. Further, two signals can be observed for each state. For example, signals $O_{00}$ and $O_{01}$ exist for $s_0$ and each of them is observed with a probability of 0.5.

The procedure of the simulation experiment using the simulation environments described above will be described. First, HOMDP is selected as the simulation environment and during a period of the initial ten trials the supervisor 209 teaches the action selecting section 107 the series of actions which allows the apparatus to earn a reward in the shortest time. Although the learning system performs learning during the period, it cannot learn all action patterns.

In and after the $251^{st}$ trial MDP is selected as the simulation environment and during a period till $260^{th}$ trial the supervisor 209 teaches the action selecting section 107 the series of actions which allows the apparatus to earn a reward in the shortest time. Although the learning system performs learning during the period, it cannot learn all action patterns.

In and after the $501^{st}$ trial HOMDP is again selected as the simulation environment. Teaching is not performed by the supervisor 209. Accordingly, the learning system 100 has to adapt to the environment suddenly changed.

In and after the $751^{st}$ trial MDP is again selected as the simulation environment. Teaching is not performed by the supervisor 209. Accordingly, the learning system 100 has to adapt to the environment suddenly changed.

Figure 8:
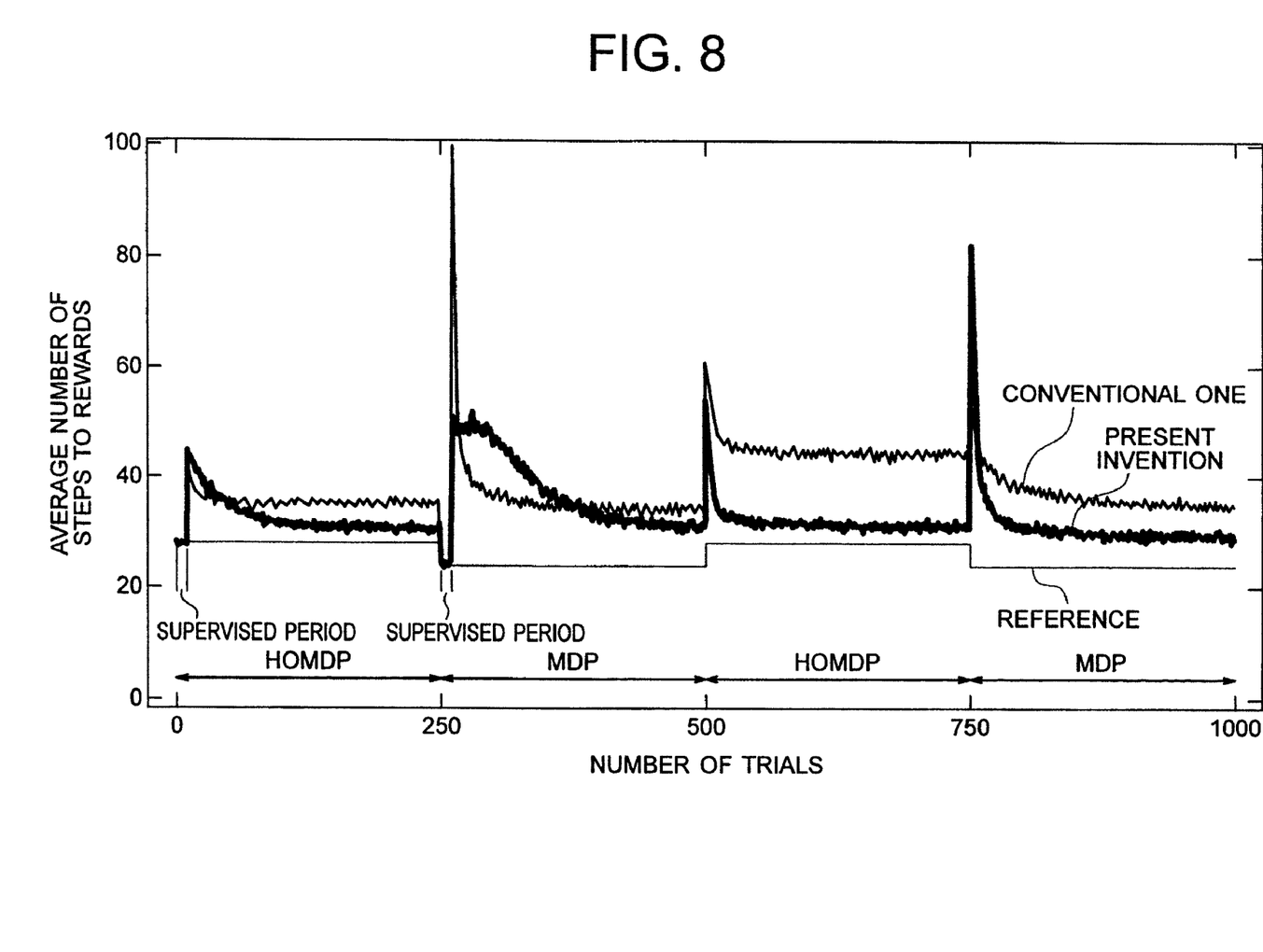
FIG. 8 shows results of simulation of the learning system according to the embodiment of the present invention and the conventional learning system.

FIG. 8 shows results of the simulation of the learning system according to the embodiment of the present invention and the conventional learning system. The horizontal axis of the graph in FIG. 8 represents the number of trials. The number of trials is 1000. Trials of the number of 250 were carried out respectively for HOMDP, MDP, HOMDP and MDP in this order as described above. The vertical axis of the graph in FIG. 8 represents the average number of steps to rewards. The average was got over 2000 sets, each of which includes the 1000 trails. The step means selection of an action. That is, the number of steps is the number of selected actions. Each trial begins with the final state of the immediately preceding trial and ends when the learning system earns a reward or the number of steps reaches 100 without earning a reward.

In FIG. 8 the thicker line indicates the learning system according to the embodiment of the present invention. In FIG. 8 the thicker line is labeled PRESENT INVENTION. In FIG. 8 the thinner line indicates a conventional learning system using SARSA (State-Action-Reward-State-Action) learning rule with eligibility trace. In FIG. 8 the thinner line is labeled CONVENTIONAL ONE. Parameter $\lambda$ of eligibility trace is 0.7. The straight line indicates the minimum number of steps with which a reward is earned in the shortest time. In FIG. 8 the straight line is labeled REFERENCE.

In the learning system according to the embodiment of the present invention, the learning constant $\alpha$ of Expression (3) is set to 0.05 while the discount rate $\gamma$ of Expression (1) is set to 0.95. In the conventional learning system, the learning constant $\alpha$ is set to 0.1 while the discount rate $\gamma$ is set to 0.9, because performances of the system were poorer when the same parameters as those of the embodiment were used.

As shown in the graph of FIG. 8 the final average number of steps of the conventional system for the second HOMDP is approximately 45 and larger than the final average number of steps for the first HOMDP (approximately 35). Further, the final average number of steps for the second MDP is approximately 40 and larger than the final average number of steps for the first MDP (approximately 35). On the other hand, the final average numbers of steps of the system according to the embodiment of the present invention for the first HOMDP, the first MDP, the second HOMDP and the second MDP are approximately 30.

In the conventional system, learning results in an environment before a change badly affected learning in the environment after the change so that the learning speed was decreased. In the system according to the embodiment of the present invention, the learning speed was not decreased after a change of environment. Further, for each environment the average number of steps of the system according to the embodiment of the present invention was smaller than the average number of steps of the conventional system. Accordingly, learning performance in each environment of the system according to the embodiment of the present invention is superior to that of the conventional system.

Thus, the system according to the embodiment of the present invention is superior to the system using conventional SARSA (State-Action-Reward-State-Action) learning rule both in learning to adapt to a change of environment and in learning in a certain environment. Further, the system according to the embodiment of the present invention does not use an environment model with a complicated structure so that computational costs are not increased.

What is claimed is:

1. A learning system comprising:
    an event list database for storing a plurality of event lists, each of the event lists being a set including a series of state-action pairs which reaches a state-action pair immediately before earning a reward;
    an event list managing section for classifying state-action pairs into the plurality of event lists for storing; and
    a learning control section for updating expectation of reward of a state-action pair which is an element of each of the plurality of event lists.

2. A learning system according to claim 1 further comprising a temporary list storing section wherein every time an action is selected the event list managing section has the state-action pair stored in the temporary list storing section and every time a reward is earned the event list managing section has a state-action pair in a set of state-action pairs stored in the temporary list storing section, which has not been stored in the event list database, stored as an element of the event list of the state-action pair immediately before earning the reward in the event list database.

3. A learning system according to claim 1 wherein every time a reward is earned the learning control section updates, using a value of the reward, expectation of reward of a state-action pair which is an element of the event list of the state-action pair immediately before earning the reward and updates, using 0 as a value of reward, expectation of reward of a state-action pair which is an element of the event lists except the event list of the state-action pair immediately before earning the reward.

4. A learning method in a learning system having an event list database for storing a plurality of event lists, each of the event lists being a set including a series of state-action pairs which reaches a state-action pair immediately before earning a reward, an event list managing section and a learning control section, the method comprising the steps of:
classifying, by the event list managing section, state-action pairs into the plurality of event lists for storing; and
updating, by the learning control section, expectation of reward of a state-action pair which is an element of each of the plurality of event lists.

5. A learning method according to claim 4 wherein every time an action is selected the event list managing section has the state-action pair temporarily stored and every time a reward is earned the event list managing section has a state-action pair in a set of state-action pairs temporarily stored, which has not been stored in the event list database, stored as an element of the event list of the state-action pair immediately before earning the reward in the event list database.

6. A learning method according to claim 4 wherein every time a reward is earned the learning control section updates, using a value of the reward, expectation of reward of a state-action pair which is an element of the event list of the state-action pair immediately before earning the reward and updates, using 0 as a value of reward, expectation of reward of a state-action pair which is an element of the event lists except the event list of the state-action pair immediately before earning the reward.

* * * * *